(12) United States Patent
Wasylenko et al.

(10) Patent No.: US 10,563,045 B2
(45) Date of Patent: Feb. 18, 2020

(54) STABILIZATION OF MIXED CATALYST POLYETHYLENE

(71) Applicant: NOVA Chemicals (International) S.A., Fribourg (CH)

(72) Inventors: Derek Wasylenko, Calgary (CA); Tony Tikuisis, Calgary (CA); Owen Lightbody, Calgary (CA); Fraser Waldie, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 71 days.

(21) Appl. No.: 15/850,017

(22) Filed: Dec. 21, 2017

(65) Prior Publication Data

US 2019/0194425 A1 Jun. 27, 2019

(51) Int. Cl.
| | |
|---|---|
| *C08K 5/00* | (2006.01) |
| *C08K 5/105* | (2006.01) |
| *C08K 5/526* | (2006.01) |
| *C08K 5/527* | (2006.01) |
| *C08L 23/06* | (2006.01) |
| *C08L 23/08* | (2006.01) |

(52) U.S. Cl.
CPC .............. *C08K 5/527* (2013.01); *C08K 5/105* (2013.01); *C08K 5/526* (2013.01); *C08L 23/06* (2013.01); *C08L 23/08* (2013.01); *C08L 23/0807* (2013.01); *C08K 5/005* (2013.01)

(58) Field of Classification Search
CPC ........ C08K 5/527; C08K 5/526; C08K 5/105; C08K 5/005; C08L 23/0807; C08L 23/06; C08L 23/08
See application file for complete search history.

(56) References Cited

U.S. PATENT DOCUMENTS

| | | |
|---|---|---|
| 5,206,075 A | 4/1993 | Hodgson, Jr. |
| 7,820,746 B2 | 10/2010 | Soma et al. |
| 2009/0247675 A1 | 10/2009 | Soma et al. |
| 2016/0108185 A1* | 4/2016 | Wang ................. C08F 2/001 525/240 |

OTHER PUBLICATIONS

Wild, L; Ryle, T.R.; Knobelock, D.C. and Peat, I.R.; Determination of Branching Distributions in Polyethylene and Ethylene Copolymers; Journal of Polymer Science: Polymer Physics Edition, vol. 20, (1982), pp. 441-455.
ASTM D 1925-70 (Reapproved 1988); Standard Test Method for Yellowness Index of Plastics; Current Edition approved Jan. 22, 1970. Published Mar. 1970. Originally published as D 1925-62T. Last previous edition 63T. pp. 1-3.
ASTM D 1238-04; Standard Test Method for Melt Flow Rates of Thermoplastics by Extrusion Plastometer; Current edition approved Mar. 1, 2004. Published Apr. 2004. Originally approved in 1965. Last previous edition approved in 2001 as D 1238-01. pp. 1-13.
ASTM D3895-07; Standard Test Method for Oxidative-Induction Time of Polyolefins by Differential Scanning Calorimetry; Current edition approved Apr. 1, 2007. Published Apr. 2007. Originally approved in 1980. Last previous edition approved in 2006 as D3895-06. pp. 1-8.
ASTM E313-10; Standard Practice for Calculating Yellowness and Whiteness Indices from Instrumentally Measured Color Coordinates; Current edition approved Jul. 1, 2010. Published Jul. 2010. Originally approved in 1967. Last previous edition approved in 2005 as E313-05. pp. 1-6.

* cited by examiner

*Primary Examiner* — Patrick D Niland
(74) *Attorney, Agent, or Firm* — Julie L. Heinrich

(57) ABSTRACT

The present disclosure relates to systems including a ternary stabilization package that contains a first phosphite, a second phosphite and a primary antioxidant is used in combination with a polyethylene that is polymerized with a mixed catalyst system that contains two different types of catalysts. In some embodiments the stabilized polyethylene exhibits improved color performance.

19 Claims, No Drawings

STABILIZATION OF MIXED CATALYST POLYETHYLENE

This disclosure relates to the stabilization of polyethylene and to processes to prepare stabilized polyethylene.

Several different types of catalysts systems are known for the production of polyethylene. Different types of catalysts typically produce different types of catalyst residues in polyethylene. The catalyst residues can be associated with the undesired development of color in polyethylene. We have observed that the problem of color development can be especially troublesome when the polyethylene is made with a mixed catalyst system that includes at least a first single site catalyst composition and a second Ziegler Natta catalyst composition. We have now discovered a method to mitigate this problem.

In an embodiment, provided herein is a process for stabilizing a thermoplastic polyolefin product during melt processing conditions wherein said thermoplastic polyolefin product is prepared with at least two catalyst systems and contains catalyst residues comprising:
  a) titanium;
  b) aluminum from at least one alumoxane; and
  c) magnesium from magnesium chloride;
  said process comprising the step of incorporating into said thermoplastic polyolefin a stabilizer package comprising:
  (i) a first phosphite defined by the formula (I);

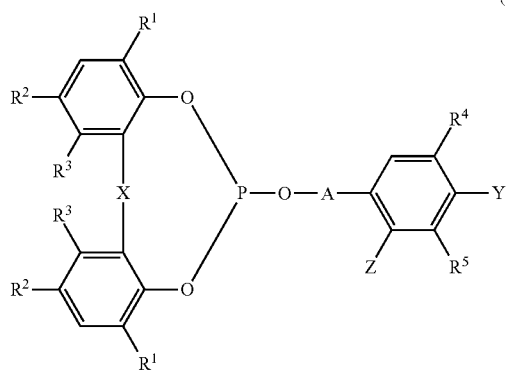

wherein R1, R2, R4 and R5 are each independently chosen from a hydrogen atom, an alkyl group having 1 to 8 carbon atoms, and R3 is chosen from a hydrogen atom or an alkyl group having 1 to 8 carbon atoms; X is chosen from a single bond, a sulfur atom or a —CHR6 group (R6 is chosen from a hydrogen atom, an alkyl group having 1 to 8 carbon atoms or a cycloalkyl group having 5 to 8 carbon atoms); A is chosen from an alkylene group having 1 to 8 carbon atoms or a *—COR7 group (R7 is chosen from a single bond or an alkylene group having 1 to 8 carbon atoms, and * denotes a bonding hand on the side of oxygen); and one of Y and Z is chosen from a hydroxyl group, an alkoxy group having 1 to 8 carbon atoms or an aralkyloxy group having 7 to 12 carbon atoms, and the other one of Y and Z is chosen from a hydrogen atom or an alkyl group having 1 to 8 carbon atoms);
  (ii) a second phosphite that is different from said first phosphite; and
  (iii) a hindered phenolic antioxidant;
subjecting said thermoplastic polyolefin product to sufficient temperature to melt said polyolefin.

In another embodiment, provided herein is a process for preparing a thermoplastic polyethylene product comprising: a process for preparing a thermoplastic polyethylene product comprising:
1) polymerizing polyethylene, optionally with one or more $C_{3-10}$ alpha olefins, under solution polymerization conditions in the presence of a first single site catalyst system comprising an organotitanium catalyst and an aluminoxane cocatalyst to form a first polyethylene solution;
2) polymerizing polyethylene, optionally with one or more C3-10 alpha olefins, under solution polymerization conditions in the presence of a second catalyst system comprising a titanium catalyst; an organoaluminum cocatalyst and magnesium chloride to form a second polyethylene solution;
3) combining said first polyethylene solution and said second polyethylene solution to form a combined polyethylene solution;
4) recovering said thermoplastic polyethylene product from said combined polyethylene solution; and
5) adding to said thermoplastic polyethylene product a stabilizer system comprising:
  (i) a first phosphite defined by the formula (I);

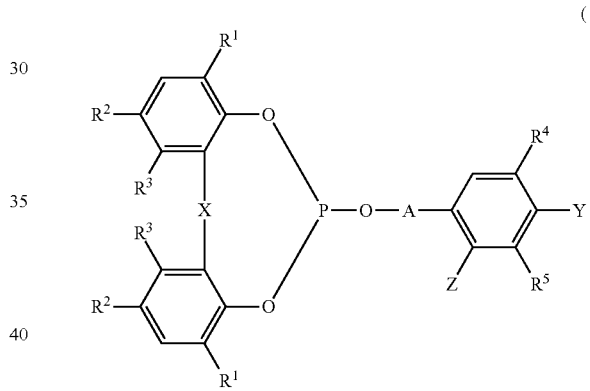

wherein R1, R2, R4 and R5 are each independently chosen from a hydrogen atom, an alkyl group having 1 to 8 carbon atoms, and R3 is chosen from a hydrogen atom or an alkyl group having 1 to 8 carbon atoms; X is chosen from a single bond, a sulfur atom or a —CHR6 group (R6 is chosen from a hydrogen atom, an alkyl group having 1 to 8 carbon atoms or a cycloalkyl group having 5 to 8 carbon atoms); A is chosen from an alkylene group having 1 to 8 carbon atoms or a *—COR7 group (R7 is chosen from a single bond or an alkylene group having 1 to 8 carbon atoms, and * denotes a bonding hand on the side of oxygen); and one of Y and Z is chosen from a hydroxyl group, an alkoxy group having 1 to 8 carbon atoms or an aralkyloxy group having 7 to 12 carbon atoms, and the other one of Y and Z is chosen from a hydrogen atom or an alkyl group having 1 to 8 carbon atoms);
  (ii) a second phosphite that is different from said first phosphite; and
  (iii) a hindered phenolic antioxidant.

Definition of Terms

Other than in the examples or where otherwise indicated, all numbers or expressions referring to quantities of ingredients, extrusion conditions, etc., used in the specification and claims are to be understood as modified in all instances by the term "about". Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying FIGURES and the description of the various embodiments throughout.

Herein the term "desired color index" defines a measurement of color, e.g. a number that correlates with an observer's perception of a color, where the observer has normal color vision. Non-limiting examples of color indexes, include "a Whiteness Index (WI)" and "a Yellowness Index (YI)"; in this disclosure WI and YI are measured according to ASTM E313-10.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain.

As used herein, the terms "ethylene polymer" and polyethylene, refer to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymer produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using metallocene or single-site catalysts. Typically, homogeneous ethylene interpolymers have narrow molecular weight distributions, for example gel permeation chromatography (GPC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild et al., J. Polym. Sci., Part B, Polym. Phys., Vol. 20 (3), pages 441-455. Typically the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers.

It is well known to those skilled in the art, that homogeneous ethylene interpolymers are frequently further subdivided into "linear homogeneous ethylene interpolymers" and "substantially linear homogeneous ethylene interpolymers". These two subgroups differ in the amount of long chain branching: more specifically, linear homogeneous ethylene interpolymers have less than about 0.01 long chain branches per 1000 carbon atoms; while substantially linear ethylene interpolymers have greater than about 0.01 to about 3.0 long chain branches per 1000 carbon atoms. A long chain branch is macromolecular in nature, i.e. similar in length to the macromolecule that the long chain branch is attached to. Hereafter, in this disclosure, the term "homogeneous ethylene interpolymer" refers to both linear homogeneous ethylene interpolymers and substantially linear homogeneous ethylene interpolymers.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers commonly used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms chosen from boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms chosen from boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" and its superscript form "$^{R1}$" refers to a first reactor in a continuous solution polymerization process; it being understood that R1 is distinctly different from the symbol $R^1$; the latter is used in chemical formula, e.g. representing a hydrocarbyl group. Similarly, the term "R2" and it's superscript form "$^{R2}$" refers to a second reactor, and; the term "R3" and it's superscript form "$^{R3}$" refers to a third reactor.

As used herein, the term "oligomers" refers to an ethylene polymer of low molecular weight, e.g., an ethylene polymer with a weight average molecular weight (Mw) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

Stabilizer Package

The stabilizer package disclosed herein comprises at least three ingredients: a first phosphite; a second phosphite and a hindered phenolic. Further details are provided below.

First Phosphite

The first phosphite is most broadly defined by formula (I) above. In some embodiments, a preferred species of this first phosphite is 6-[3-(3-tert-butyl-4-hydroxy-5-methylphenyl) propoxy]-2,4,8,10-tetra-tert-butyldibenzo[d,f][1,3,2]dioxaphosphepin (CAS Reg. No. 203255-81-6) and is sold under the trademark name SUMILIZER™ GP by Sumitomo. The use of this phosphite is described in combination with a polyol (such as pentaerythritol) in U.S. Pat. No. 7,820,746. A polyol may also be (optionally) used in this invention but it is not essential.

Second Phosphite

The second phosphite is different from the first phosphite and may be any of the phosphites that are conventionally used for the stabilization of polyolefins. Suitable examples include:

Simple mono aryl phosphites such as IRGAFOS™ 168 [2,4di-tertiary butyl phenyl phosphite, CAS Registry number 31570-04-4] from BASF; oligomeric phosphites such as WESTON™ 705 [CAS Registry Number 939402-02-5] and DOVERPHOS™ LGP11 [CAS Registry number 1227937-46-3] from Dover Chemical Corporation; phosphonites such as IRGAFOS PEP-Q™ from BASF and diphosphites such as DOVERPHOS™9228.

In some embodiments, each of the first and second phosphites is used in amounts from 100 to 2000 ppm, of for example 300 to 1500 ppmor for example from 400 to 1000 ppm (based on the weight of said thermoplastic polyethylene product).

Hindered Phenolic Antioxidant

The hindered phenolic antioxidant may be any of the molecules that are conventionally used as primary antioxidants for the stabilization of polyolefins. Suitable examples include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; and 2,6-di-tert-butyl-4-methoxymethylphenol.

Two (non limiting) examples of suitable hindered phenolic antioxidants are sold under the trademarks IRGANOX™

1010 (CAS Registry number 6683-19-8) and IRGANOX™ 1076 (CAS Registry number 2082-79-3) by BASF Corporation.

In an embodiment, the hindered phenolic antioxidant is used in an amount of from 100 to 2000 ppm, especially from 400 to 1000 ppm (based on the weight of said thermoplastic polyethylene product).

(Optional) Long Term Stabilizers

Plastic parts which are intended for long term use may preferably contain at least one Hindered Amine Light Stabilizer (HALS). HALS are well known to those skilled in the art.

When employed, the HALS is preferably a commercially available material and is used in a conventional manner and amount.

Commercially available HALS include those sold under the trademarks CHIMASSORB™ 119; CHIMASSORB 944; CHIMASSORB 2020; TINUVIN™ 622 and TINUVIN 770 from Ciba Specialty Chemicals Corporation, and CYASORB™ UV 3346, CYASORB UV 3529, CYASORB UV 4801, and CYASORB UV 4802 from Cytec Industries. In some embodiments, TINUVIN 622 is preferred. Mixtures of more than one HALS are also contemplated.

Suitable HALS include: bis (2,2,6,6-tetramethylpiperidyl)-sebacate; bis-5(1,2,2,6,6-pentamethylpiperidyl)-sebacate; n-butyl-3,5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxypiperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone).

Catalysts

Organometallic catalyst formulations that are efficient in polymerizing olefins are well known in the art. In the embodiments disclosed herein, at least two catalyst formulations are employed in a continuous solution polymerization process. One of the catalyst formulations comprises at least one single-site catalyst formulation that produces a homogeneous first ethylene interpolymer. The other catalyst formulation comprises at least one heterogeneous catalyst formulation that produces a heterogeneous second ethylene interpolymer. Optionally a third ethylene interpolymer may be produced using the heterogeneous catalyst formulation that was used to produce the second ethylene interpolymer, or a different heterogeneous catalyst formulation may be used to produce the third ethylene interpolymer. In the continuous solution process, the at least one homogeneous ethylene interpolymer and the at least one heterogeneous ethylene interpolymer are solution blended and an ethylene interpolymer product is produced; for convenience, this product is referred to herein as "thermoplastic polyethylene product."

Single Site Catalyst Formulation

The catalyst components which make up the single site catalyst formulation are not particularly limited, i.e. a wide variety of catalyst components can be used. One non-limiting embodiment of a single site catalyst formulation comprises the following three or four components: a bulky ligand-metal complex; an alumoxane co-catalyst; an ionic activator and optionally a hindered phenol. In this disclosure: "(i)" refers to the amount of "component (i)", i.e. the bulky ligand-metal complex added to R1; "(ii)" refers to "component (ii)", i.e. the alumoxane co-catalyst; "(iii)" refers to "component (iii)" i.e. the ionic activator, and; "(iv)" refers to "component (iv)", i.e. the optional hindered phenol.

Non-limiting examples of component (i) are represented by formula (I):

$$(L^A)_a M(PI)_b (Q)_n \qquad (I)$$

wherein $(L^A)$ represents a bulky ligand; M represents a metal atom; PI represents a phosphinimine ligand; Q represents a leaving group; a is 0 or 1; b is 1 or 2; (a+b)=2; n is 1 or 2, and; the sum of (a+b+n) equals the valance of the metal M.

Non-limiting examples of the bulky ligand $L^A$ in formula (I) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of η-bonding to the metal M, such embodiments include both $η^3$-bonding and $η^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

The metal M in formula (I) may be a Group 4 metal: titanium, zirconium and hafnium. In some embodiments, M is titanium because in other embodiments using a single site catalyst formulation comprising an organotitanium catalyst, severe color formation can occur.

The phosphinimine ligand, PI, is defined by formula (II):

$$(R^p)_3 P=N— \qquad (II)$$

wherein the $R^p$ groups are independently chosen from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula $—Si(R^s)_3$, wherein the $R^s$ groups are independently chosen from, a hydrogen atom, a $C_{1-8}$ alkyl or alkoxy radical, a $C_{6-10}$ aryl radical, a $C_{6-10}$ aryloxy radical, or a germanyl radical of formula $—Ge(R^G)_3$, wherein the $R^G$ groups are defined as $R^s$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ arly or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of component (i) of the single site catalyst formulation include structural, optical or enantiomeric isomers (meso and racemic isomers) and mixtures thereof of the bulky ligand-metal complexes described in formula (I) above.

The second single site catalyst component, component (ii), is an alumoxane co-catalyst that activates component (i) to a cationic complex. An equivalent term for "alumoxane" is "aluminoxane"; although the exact structure of this co-catalyst is uncertain, subject matter experts generally agree that it is an oligomeric species that contain repeating units of the general formula (III):

$$(R)_2AlO-(Al(R)-O)_n-Al(R)_2 \quad (III)$$

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

Optionally, a third catalyst component (iii) of the single site catalyst formation is an ionic activator. In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below:

$$[R^5]^+[B(R^7)_4]^- \quad (IV)$$

where B represents a boron atom, $R^5$ is an aromatic hydrocarbyl (e.g. triphenyl methyl cation) and each $R^7$ is independently chosen from phenyl radicals which are unsubstituted or substituted with from 3 to 5 substituents chosen from fluorine atoms, $C_{1-4}$ alkyl or alkoxy radicals which are unsubstituted or substituted by fluorine atoms; and a silyl radical of formula —$Si(R^9)_3$, where each $R^9$ is independently chosen from hydrogen atoms and $C_{1-4}$ alkyl radicals, and; compounds of formula (V):

$$[(R^8)_tZH]^+[B(R^7)_4]^- \quad (V)$$

where B is a boron atom, H is a hydrogen atom, Z is a nitrogen or phosphorus atom, t is 2 or 3 and $R^8$ is chosen from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethyiphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

An optional fourth catalyst component of the single site catalyst formation is a hindered phenol, component (iv). Non-limiting example of hindered phenols include butylated phenolic antioxidants, butylated hydroxytoluene, 2,4-di-tertiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

Heterogeneous Catalyst Formulations

A number of heterogeneous catalyst formulations are well known to those skilled in the art, including, Ziegler-Natta (Z/N) and chromium catalyst formulations. This invention is most relevant to the use of a Z/N catalyst as the heterogeneous catalyst formulation because we have observed severe color formation when a Z/N catalyst is used.

In this disclosure, embodiments include an in-line Ziegler-Natta catalyst formulation and a batch Ziegler-Natta catalyst formation. The term "in-line Ziegler-Natta catalyst formulation" refers to the continuous synthesis of a small quantity of active Ziegler-Natta catalyst and immediately injecting this catalyst into at least one continuously operating reactor, wherein the catalyst polymerizes ethylene and one or more optional α-olefins to form an ethylene interpolymer. The terms "batch Ziegler-Natta catalyst formulation" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst" refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, where an active catalyst is formed and polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a titanium compound, an alkyl aluminum co-catalyst and an aluminum alkyl. In this disclosure: "(v)" refers to "component (v)" the magnesium compound; the term "(vi)" refers to the "component (vi)" the chloride compound; "(vii)" refers to "component (vii)" the metal compound; "(viii)" refers to "component (viii)" alkyl aluminum co-catalyst, and; "(ix)" refers to "component (ix)" the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the titanium compound is supported on the magnesium chloride. Non-limiting examples of suitable metal compounds include $Ti(X)_n$ or $TiO(X)_n$; where; O represents oxygen, and; X represents chloride or bromide; n is an integer from 3 to 6 that satisfies the oxidation state of the metal. Additional non-limiting examples of suitable Ti compounds include Ti alkyls, Ti alkoxides (which may be prepared by reacting a metal alkyl with an alcohol) and mixed-ligand Ti compounds that contain a mixture of halide, alkyl and alkoxide ligands. In the third step a solution of an alkyl aluminum co-catalyst (component (viii)) is added to the Ti compound supported on the magnesium chloride. A wide variety of alkyl aluminum co-catalysts are suitable, as expressed by formula (VI):

$$Al(R^4)_p(OR^5)_q(X)_r \quad (VI)$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof. To produce an active in-line Ziegler-Natta catalyst formulation the quantity and mole ratios of the five components, (v) through (ix), are optimized using techniques that are well known to those skilled in the art.

Solution Polymerization

A variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene and 1-octene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

It is well known to individuals experienced in the art that reactor feed streams (solvent, monomer, α-olefin, hydrogen, catalyst formulation, etc.) should be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

The solution polymerization process used to prepare the polyethylenes used in this invention preferably uses at least two reactors in series (for convenience, R1 and R2).

In the embodiments the operating temperatures of the solution polymerization reactors can vary over a wide range. For example, the upper limit on reactor temperatures in some cases may be about 300° C., in other cases about 280° C. and in still other cases about 260° C.; and the lower limit in some cases may be about 80° C., in other cases about 100° C. and in still other cases about 125° C. The second reactor, (R2), is normally operated at a higher temperature than the first reactor. The maximum temperature difference between these two reactors in some cases is about 120° C., in other cases about 100° C. and in still other cases about 80° C.; the minimum in some cases is about 1° C., in other cases about 5° C. and in still other cases about 10° C. An optional tubular reactor, (R3), may be operated in some cases about 100° C. higher than R2; in other cases about 60° C. higher than R2, in still other cases about 10° C. higher than R2 and in alternative cases 0° C. higher, i.e. the same temperature as R2. The temperature within optional R3 may increase along its length. The maximum temperature difference between the inlet and outlet of R3 in some cases is about 100° C., in other cases about 60° C. and in still other cases about 40° C. The minimum temperature difference between the inlet and outlet of R3 is in some cases may be 0° C., in other cases about 3° C. and in still other cases about 10° C. In some cases R3 is operated an adiabatic fashion and in other cases R3 is heated. R3 is in series with R2 and is downstream of R2.

The pressure in the polymerization reactors should be high enough to maintain the polymerization solution as a single phase solution and to provide the upstream pressure to force the polymer solution from the reactors through a heat exchanger and on to polymer recovery operations. The operating pressure of the solution polymerization reactors can vary over a wide range. For example, the upper limit on reactor pressure in some cases may be about 45 MPag, in other cases about 30 MPag and in still other cases about 20 MPag; and the lower limit in some cases may be about 3 MPag, in other some cases about 5 MPag and in still other cases about 7 MPag.

Acid Neutralizer (or "Passivator")

A passivator (which may also be referred to as an acid neutralizer) is added to a deactivated solution to form a passivated solution. The passivator may be neat (100%) passivator, a solution of passivator in a solvent, or a slurry of passivator in a solvent. Non-limiting examples of suitable solvents include linear or branched $C_5$ to $C_{12}$ alkanes. In this disclosure, how the passivator is added is not particularly important. Suitable passivators are well known in the art, non-limiting examples include alkali or alkaline earth metal salts of carboxylic acids (i.e. calcium stearate) or hydrotalcites. The quantity of passivator added can vary over a wide range. In an embodiment, the molar quantity of passivator added is determined by the total moles of chloride compounds added to the solution process, i.e. the chloride compound "component (vi)" plus the metal compound "compound (vii)". Optionally, a first and second chloride compound and a first and second metal compound may be used, i.e. to form the first and second heterogeneous catalyst formulations; in this case the amount of passivator added is determined by the total moles all chloride containing compounds. The upper limit on passivator mole ratio (moles passivator)/(total chlorides) molar ratio may be 20, in some cases 15 and in other cases 10. The lower limit on the (passivator)/(total chlorides) molar ratio may be about 0.2, in some cases about 0.4 and in still other cases about 0.8. In general, the passivator is added in the minimal amount to substantially passivate the deactivated solution.

Flexible Manufactured Articles

The ethylene interpolymer products disclosed herein have improved (lower) Yellowness Index (YI) and may be converted into a wide variety of flexible manufactured articles. Non-limiting examples include monolayer or multilayer films, such films are well known to those of ordinary experienced in the art. Non-limiting examples of processes to prepare such films include blown film and cast film processes.

Depending on the end-use application, the disclosed ethylene interpolymer products having improved color may be converted into films that span a wide range of thicknesses. Non-limiting examples include, food packaging films where thicknesses may range from about 0.5 mil (13 µm) to about 4 mil (102 µm), and; in heavy duty sack applications film thickness may range from about 2 mil (51 µm) to about 10 mil (254 µm).

Ethylene interpolymer products having improved color may be used in monolayer films; where the monolayer may contain more than one ethylene interpolymer product having improved color and/or additional thermoplastics; non-limiting examples of thermoplastics include ethylene polymers and propylene polymers. The lower limit on the weight percent of the ethylene interpolymer product having improved color in a monolayer film may be about 3 wt %, in other cases about 10 wt % and in still other cases about 30 wt %. The upper limit on the weight percent of the ethylene interpolymer product having improved color in the monolayer film may be 100 wt %, in other cases about 90 wt % and in still other cases about 70 wt %.

The ethylene interpolymer products having improved color disclosed herein may also be used in one or more layers of a multilayer film; non-limiting examples of multilayer films include three, five, seven, nine, eleven or more layers. The thickness of a specific layer (containing an ethylene interpolymer product having improved color) within a multilayer film may be about 5%, in other cases about 15% and in still other cases about 30% of the total multilayer film thickness. In other embodiments, the thickness of a specific layer (containing the ethylene interpolymer product having improved color) within a multilayer film may be about 95%, in other cases about 80% and in still other cases about 65% of the total multilayer film thickness. Each individual layer of a multilayer film may contain more than one ethylene interpolymer product having improved color and/or additional thermoplastics.

Additional embodiments include laminations and coatings, wherein mono or multilayer films containing the disclosed ethylene interpolymer products having improved color are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art.

There is a need to improve the color of articles manufactured from ethylene interpolymer for some applications. The color of a manufactured article is an important attribute; frequently color is often a customer's first impression of quality. In some embodiments it is essential that the color of a manufactured article meets the expectations of the customer. The ethylene interpolymer products having improved color disclosed herein can be used in a wide range of manufactured articles, e.g. articles that comprise one or more films (monolayer or multilayer). Non-limiting examples of such manufactured articles include: food packaging films (fresh and frozen foods, liquids and granular foods), vacuum sealable food packaging, stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g. sealant and/or toughness layers. Additional manufactured articles comprising one or more films containing at least one ethylene interpolymer product having improved color include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) comprising at least one embodiment of the disclosed ethylene interpolymer products having improved color.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), puncture-propagation tear resistance, tensile properties (yield strength, break strength, elongation at break, toughness, etc.) and heat sealing properties (heat seal initiation temperature and hot tack strength). Specific hot tack and heat sealing properties are desired in high speed vertical and horizontal form-fill-seal processes that load and seal a commercial product (liquid, solid, paste, part, etc.) inside a pouch-like package.

The films used in the manufactured articles described in this section may optionally include, depending on its intended use, additives and adjuvants in addition to the stabilizer package described above. Non-limiting examples of additives and adjuvants include, anti-blocking agents, heat stabilizers, slip agents, processing aids, anti-static additives, colorants, dyes, filler materials, light stabilizers, light absorbers, lubricants, pigments, plasticizers, nucleating agents and combinations thereof.

Rigid Manufactured Articles

The ethylene interpolymer products disclosed herein having improved (lower) Yellowness Index (YI) may be converted into a wide variety of rigid manufactured articles. Non-limiting examples include: deli containers, margarine tubs, drink cups and produce trays; household and industrial containers, cups, bottles, pails, crates, tanks, drums, bumpers, lids, industrial bulk containers, industrial vessels, material handling containers, bottle cap liners, bottle caps, living hinge closures; toys, playground equipment, recreational equipment, boats, marine and safety equipment; wire and cable applications such as power cables, communication cables and conduits; flexible tubing and hoses; pipe applications including both pressure pipe and non-pressure pipe markets, e.g. natural gas distribution, water mains, interior plumbing, storm sewer, sanitary sewer, corrugated pipes and conduit; foamed articles manufactured from foamed sheet or bun foam; military packaging (equipment and ready meals); personal care packaging, diapers and sanitary products; cosmetic, pharmaceutical and medical packaging, and; truck bed liners, pallets and automotive dunnage. The rigid manufactured articles summarized in this paragraph contain one or more of the ethylene interpolymer products having improved color or a blend of at least one of the ethylene interpolymer products disclosed herein having improved color with at least one other thermoplastic.

Such rigid manufactured articles may be fabricated using the following non-limiting processes: injection molding, compression molding, blow molding, rotomolding, profile extrusion, pipe extrusion, sheet thermoforming and foaming processes employing chemical or physical blowing agents.

The desired physical properties of rigid manufactured articles depend on the application of interest. Non-limiting examples of desired properties include: flexural modulus (1% and 2% secant modulus); tensile toughness; environmental stress crack resistance (ESCR); slow crack growth resistance (PENT); abrasion resistance; shore hardness; deflection temperature under load; VICAT softening point; IZOD impact strength; ARM impact resistance; Charpy impact resistance, and; color (whiteness and/or yellowness index).

A further objective of the present disclosure is to provide rigid manufactured articles comprising ethylene interpolymer products having improved color that have improvements in at least one desirable physical property; relative to rigid manufactured articles formed from comparative ethylene interpolymers.

EXAMPLES

Polymerization of Thermoplastic Polyethylene Product

The following examples are presented for the purpose of illustrating selected embodiments of this disclosure; it being understood, that the examples presented do not limit the claims presented.

Embodiments of ethylene interpolymer product having improved Yellowness Index (YI) were produced in a continuous solution polymerization pilot plant comprising reactors arranged in a series configuration. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 4.8 gallons (18 L). Examples of ethylene interpolymer products were produced using an R1 pressure from about 14 MPa to about 18 MPa; R2 was operated at a lower pressure to facilitate continuous flow from R1 to R2. R1 and R2 were operated in series mode, wherein the first exit stream from R1 flows directly into R2. Both CSTR's were agitated to give conditions in which the reactor contents were well mixed. The process was operated continuously by feeding fresh process solvent, ethylene, 1-octene and hydrogen to the reactors.

The single site catalyst components used were: component (i), cyclopentadienyl tri(tertiary butyl)phosphinimine titanium dichloride, $(Cp[(t-Bu)_3PN]TiCl_2)$, hereafter PIC-1; component (ii), methylaluminoxane (MAO-07); component (iii), trityl tetrakis(pentafluoro-phenyl)borate, and; component (iv), 2,6-di-tert-butyl-4-ethylphenol. The single site catalyst component solvents used were methylpentane for components (ii) and (iv) and xylene for components (i) and (iii). Suitable mole ratios of single site catalyst components are: R1 (ii)/(i) mole ratio=100.03, i.e. [(MAO-07)/(PIC-1)]; R1 (iv)/(ii) mole ratio=0.0, i.e. [(2,6-di-tert-butyl-4-ethylphenol)/(MAO-07)], and; R1 (iii)/(i) mole ratio=1.1, i.e. [(trityl tetrakis(pentafluoro-phenyl)borate)/(PIC-1)]. The single site catalyst formulation is injected into R1 using process solvent.

The in-line Ziegler-Natta catalyst formulation was prepared from the following components: component (v), butyl ethyl magnesium; component (vi), tertiary butyl chloride; component (vii), titanium tetrachloride; component (viii), diethyl aluminum ethoxide, and; component (ix), triethyl aluminum. Methylpentane was used as the catalyst component solvent. The in-line Ziegler-Natta catalyst formulation was prepared using the following steps. In step one, a solution of triethylaluminum and dibutylmagnesium ((triethylaluminum)/(dibutylmagnesium) molar ratio of 20) was combined with a solution of tertiary butyl chloride and allowed to react for a Hold Up Time (HUT) of about 30 seconds (HUT-1); in step two, a solution of titanium tetrachloride was added to the mixture formed in step one and allowed to react for about 14 seconds (HUT-2), and; in step three, the mixture formed in step two was allowed to react for an additional 3 seconds (HUT-3) prior to injection into R2. The in-line Ziegler-Natta procatalyst formulation was injected into R2 using process solvent, the flow rate of the catalyst containing solvent was about 49 kg/hr, the temperature of this line (the second catalyst solution temperature, CST-2) was adjusted. The in-line Ziegler-Natta catalyst formulation was formed in R2 by injecting a solution of diethyl aluminum ethoxide into R2. In an embodiment, the following mole ratios were used to synthesize the in-line Ziegler-Natta catalyst: R2 (vi)/(v) mole ratio=2.07; R2 (viii)/(vii) mole ratio=1.35, and; R2 (ix)/(vii) mole ratio=0.35.

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of titanium and aluminum added to the polymerization process; to be clear, the moles of octanoic acid added=0.5×(moles titanium+moles aluminum); this mole ratio was consistently used in all examples.

A two-stage devolatilization process was employed to recover the ethylene interpolymer product from the process solvent, i.e. two vapor/liquid (V/L) separators were used and the second bottom stream (from the second V/L separator) was passed through a gear pump/pelletizer combination. DHT-4V (hydrotalcite), supplied by Kisuma Chemical Industry (Japan) was used as a passivator, or acid neutralizer, in the continuous solution process. The CAS Registry number for a suitable hydrotalcite is 1097-59-9. A slurry of DHT-4V in process solvent was added prior to the first V/L separator. The molar amount of DHT-4V added was about 10-fold higher than the molar amount of chlorides added to the process; the chlorides added were titanium tetrachloride and tertiary butyl chloride.

Prior to pelletization the ethylene interpolymer product was stabilized by adding a stabilizer package to the ethylene interpolymer product. The components of the stabilizer package were dissolved in process solvent and added between the first and second V/L separators.

Thermoplastic polyethylene product produced in this manner can contain catalyst residues in the following amounts: titanium (from 1 to 15 ppm); aluminum (from 10 to 200 ppm) and magnesium (from 10 to 250 ppm).

The experiments of the following examples were performed on a co-rotating twin screw extruder having a screw diameters of 34 mm and length/diameter ratio=33.5. The melt temperature was set at 225° C. Output was approximately 13 kilograms/hr, at 200 revolutions per minute. Color and melt index (MI) were measured after passes 0, 1, 3, and 5. Color measurements were performed in accordance with ASTM standards (yellowness index or "YI" was determined according to ASTM D 1925). Melt index measurements were conducted using conditions 190° C./2.16 kg ($MI_2$) and 190° C./21.6 kg ($MI_{21}$) in accordance with ASTM standard D1238. Differential scanning calorimetry (DSC) oxidative induction time (OIT) experiments are conducted in accordance to ASTM D3895 and are reported as the time required before degradation of a polymer melt occurs when exposed to 200° C. and 100% oxygen atmosphere. Gas fading performance is evaluated by exposing polyethylene plaques to an atmospheric fume chamber maintained at 140° F. that contains fumes emitted from a burning natural gas stream, releasing small amounts of NOx gases.

The additives used for the stabilizer package in the examples are as follows.

AO1 a hindered phenolic primary antioxidant: Octadecyl 3-(3,5-di-tert-butyl-4-hydroxyphenyl)propionate (CAS Reg. No. 2082-79-3) (IRGANOX™1076)

P1: 6-[3-(3-tert-butyl-4-hydroxy-5-methylphenyl) propoxy]-2,4,8,10-tetra-tert-butyldibenzo[d,f][1,3,2] dioxaphospepin (CAS Reg. No. 203255-81-6) (SUMILIZER™GP)—within the definition of formula (I), above;

P2: Tris(2-4-di-tert-butylphenyl)phosphite (CAS Reg. No. 31570-04-4) (IRGAFOS™168)

Example 1

The thermoplastic polyethylene product used in all experiments of example 1 was an ethylene-octene copolymer having a density of about 0.916 g/cc and a melt index, $I_2$ (as determined by ASTM D 1238) of about 1.0 grams per 10 minutes. This product was produced in a solution phase polymerization process using Zeigler-Natta and single-site type catalysts in the manner described above. Analysis of a sample of this polymer showed the following catalyst residues in parts per million by weight (ppm):
titanium: 7.2
aluminum: 83
magnesium: 177

TABLE 1

Stabilizer formulations for multiple pass extrusion experiments.

| Formulation | AO1 | P1 | P2 |
| --- | --- | --- | --- |
| C1 | 1000 | 0 | 1000 |
| IE1 | 500 | 500 | 500 |
| IE2 | 250 | 500 | 750 |

Control formulation (C1) consists of a conventional stabilizer package containing 1000 ppm of a phenolic antioxidant, 1000 ppm of a phosphite antioxidant, each sold under the trademarks of IRGANOX™ 1076, IRGAFOS™ 168, respectively, by BASF. Inventive formulation 1 (IE1) contains a ternary blend of antioxidants containing 500 ppm of IRGANOX™ 1076, 500 ppm of IRGAFOS™ 168, and 500 ppm of the hybrid phenolic and phosphite-based antioxidant, sold under the trademark of SUMILIZER™ GP by Sumitomo. Inventive example 2 (IE2) contains 250 ppm of IRGANOX™ 1076, 750 ppm of IRGAFOS™ 168, and 500 ppm of SUMILIZER™ GP. The purpose of this study was to demonstrate the performance improvement imparted through the use of optimized ternary blends of antioxidants.

TABLE 2

Change in Color (YI) for various additive formulations after multiple extrusion pass experiment (225° C.) on a twin screw extruder.

| Color | Extrusion Passes | | | |
| --- | --- | --- | --- | --- |
| (YI) | 0 | 1 | 3 | 5 |
| C1 | −1.93 | 4.61 | 12.15 | 14.69 |
| IE1 | −1.61 | 5.43 | 10.5 | 12.73 |
| IE2 | −1.78 | 4.36 | 7.97 | 11.07 |

The compositions were passed through the extruder a total of five times. Color was measured before the first pass and after passes 1, 3 and 5. All compositions became more yellow after being exposed to heat and shear in the extruder.

The observation of one resin as being more 'yellow' than another is generally perceived as a decrease in resin quality by polyethylene consumers. The data presented in Table 2 show that the inventive have better color performance over the multiple extrusion passes. Reductions in YI amount to approximately 2, and 4 units for IE1 and IE2 respectively at Pass 3. For reference, differences of 2 YI units are generally perceptible by eye.

TABLE 3

Change in Melt Index ($MI_2$) after multiple extrusion pass experiment (225° C.) on a twin screw extruder.

| $MI_2$ | Extrusion Passes | | | |
|---|---|---|---|---|
| g/10 minutes | 0 | 1 | 3 | 5 |
| C1 | 0.98 | 0.88 | 0.7 | 0.51 |
| IE1 | 0.99 | 0.93 | 0.71 | 0.50 |
| IE2 | 0.93 | 0.92 | 0.81 | 0.56 |

Melt flow rates can have major impacts on how the resins are processed. Therefore, a retention of melt index stability is desirable as it leads to more predictable extrusion performance for polyethylene convertors. Table 3 demonstrates that IE2 has good melt flow stability over the 5 extrusion passes when compared against C1, despite the lower overall antioxidant loading levels (2000 ppm vs 1500 ppm). The combination of reduced color formation with a retention in melt stability is desirable. For clarity: the $MI_2$ of C1 decreased to 0.51 g/10 minutes and the $MI_2$ of $IE_2$ decreased to 0.56 g/10 minutes after 5 passes.

TABLE 4

Oxidative induction time (OIT) of polyethylene melts exposed to 200° C. and 100% $O_2$ atmosphere.

| Formulation | OIT (min) |
|---|---|
| C1 | 63.1 |
| IE1 | 75.0 |
| IE2 | 81.2 |

Oxidation induction time (OIT) is a measure of the stability of a polymer to thermal and oxidative stress, and is normally a function of the concentration of the primary (phenolic-containing) antioxidant. Higher OIT times are generally indicative of higher thermos-oxidative stability of the polyethylene, which is desirable. As is demonstrated in Table 4, moderate improvements in thermo-oxidative stability are observed in the order IE2>IE1>C1, demonstrating the effectiveness of optimized ternary antioxidant blends for enhanced thermal stability.

TABLE 5

Gas fading performance of polyethylene formulations exposed to an atmospheric fume oven at 140° F. for 4 weeks.

| | Days in Atmospheric Fume Chamber | | | | | | | |
|---|---|---|---|---|---|---|---|---|
| Sample | 0 | 1 | 3 | 4 | 7 | 14 | 21 | 28 |
| C1 | 7.38 | 11.73 | 15.06 | 16.65 | 21.08 | 26.56 | 29.91 | 33.41 |
| IE1 | −1.81 | −0.36 | 1.86 | 2.71 | 5.32 | 10.35 | 14.23 | 18.17 |
| IE2 | −1.76 | −0.06 | 2.32 | 3.24 | 6.19 | 11.26 | 14.97 | 18.66 |

Gas fading is a process that occurs as the polymer is exposed to NOx (i.e. $NO_2$ and NO) gases that can be present in low concentration in atmospheres that contain combustion products from carbon-based fuels (e.g. natural gas and propane powered fork lifts in warehouses). Gas fading is generally believed to be the result of the NOx gases interacting with the phenolic antioxidants present in the polymer. Although the above example demonstrates an accelerated test, it is clear that the inventive examples display much lower tendency to gas fade as compared to the comparative example, C1.Y1 values are reported in Table 5. The Y1 of C1 increased from 7.38 to 33.41 after 28 days.

Example 2

The thermoplastic polyethylene product used in all experiments of example 2 was an ethylene-octene copolymer having a density of about 0.913 g/cc and a melt index, $I_2$ (as determined by ASTM D 1238) of about 0.85 grams per 10 minutes. This product was produced in a solution phase polymerization process using Zeigler-Natta and single-site type catalysts in the manner described above. Polyethylene resins with $I_2$ values of <1.0 grams per 10 min are typically called 'fractional melt' resins, and are generally more difficult to stabilize due to the higher shear stresses imparted on the polymer during processing. Analysis of a sample of this thermoplastic polyethylene product showed the following levels of catalyst residues (ppm):
titanium: 7.9
aluminum: 91
magnesium: 182

TABLE 6

Stabilizer formulations for multiple pass extrusion experiments.

| Formulation | AO1 | P1 | P2 |
|---|---|---|---|
| C2 | 1000 | 0 | 1000 |
| IE3 | 250 | 500 | 750 |

Control formulation (C2) consists of a conventional stabilizer package containing 1000 ppm of a phenolic antioxidant, 1000 ppm of a phosphite antioxidant, each sold under the trademarks of IRGANOX™ 1076, IRGAFOS™ 168, respectively, by BASF. Inventive example 3 (IE3) contains 250 ppm of IRGANOX™ 1076, 750 ppm of IRGAFOS™ 168, and 500 ppm of SUMILIZER™ GP. The purpose of this study was to demonstrate the performance improvement imparted through the use of optimized ternary blends of antioxidants.

TABLE 7

Change in Color (YI) for various additive formulations after multiple extrusion pass experiment (225° C.) on a twin screw extruder.

| Color | Extrusion Passes | | | |
|---|---|---|---|---|
| (YI) | 0 | 1 | 3 | 5 |
| C2 | −2.48 | 4.36 | 8.19 | 14.74 |
| IE3 | −2.61 | −0.46 | 1.98 | 5.02 |

As is evident from the data presented in Table 7, the inventive formulation (IE3) result in substantially decreased color formation (YI) as compared to the comparative example (C2) over the multiple extrusion passes. Reductions in YI amount to approximately 6 units for IE3 as compared to C2 at Pass 3.

TABLE 8

Change in Melt Index (MI₂) for various additive formulations after multiple extrusion pass experiment (225° C.) on a twin screw extruder.

| Color | Extrusion Passes | | | |
|---|---|---|---|---|
| (YI) | 0 | 1 | 3 | 5 |
| C2 | 0.85 | 0.74 | 0.59 | 0.43 |
| IE3 | 0.83 | 0.78 | 0.59 | 0.44 |

Table 8 demonstrates that IE3 has good melt flow stability over the 5 extrusion passes when compared against C2, despite the lower overall antioxidant loading levels (2000 ppm vs 1500 ppm).

TABLE 9

Oxidative induction time (OIT) of polyethylene melts exposed to 200° C. and 100% O₂ atmosphere.

| Formulation | OIT (min) |
|---|---|
| C2 | 61.1 |
| IE3 | 81.5 |

Higher OIT times are generally indicative of higher thermo oxidative stability of the polyethylene, which is desirable. As is demonstrated in Table 9, moderate improvements in thermo-oxidative stability are observed for IE3 as compared to C2.

TABLE 10

Gas fading performance of polyethylene formulations exposed to an atmospheric fume oven at 140° F. for 4 weeks.

| | Days in Atmospheric Fume Chamber | | | | | | | |
|---|---|---|---|---|---|---|---|---|
| Sample | 0 | 1 | 3 | 4 | 7 | 14 | 21 | 28 |
| C2 | −2.53 | −0.66 | 2.04 | 3.2 | 6.55 | 13.06 | 17.77 | 21.92 |
| IE3 | −2.51 | −0.86 | 1.86 | 2.9 | 5.91 | 11.58 | 15.5 | 19.16 |

Although the above example demonstrates an accelerated test, it is clear that the inventive example 3 (IE3) demonstrates moderately improved resistance to gas fading as compared to the comparative example, C2.

Comparative Examples

For clarity, the invention requires that the thermoplastic polyethylene product is made with two catalyst systems, namely a single site catalyst system that uses an alumoxane cocatalyst and a heterogeneous catalyst system that includes magnesium chloride. Color formation has been observed to be especially problematic with this catalyst system.

A comparative polyethylene made with a single site catalyst system essentially the same as described above (in the section entitled Polymerization of Thermoplastic Polyethylene Product) was analyzed and found to contain less than 1 ppm Ti; and 8 ppm Al (from the alumoxane cocatalyst) for a polymer having a melt index (I₂) of 1 g/10 minutes and a density of 0.917 g/cc. This polyethylene was stabilized with a conventional stabilizer package (500 ppm each of IRGANOX™ 1076 and IRGAFOS™ 168) and exhibited outstanding color performance, with the Y1 starting at −4.0 and only increasing to −0.4 after the 5 extrusion pass test described above.

A polyethylene produced with only a Z/N catalyst system substantially as described above was analyzed and found to contain about 6.5 ppm Ti; 73 ppm Al and 163 ppm Mg for a polymer having a melt index (I₂) of 1 gram/10 minutes and a density of 0.920 g/cc. This polyethylene was stabilized with a conventional stabilizer package 500 ppm each of IRGANOX™ 1076 and IRGAFOS™ 168 and exhibited good color performance, with the Y1 starting at −2.5 and increasing to 7.7 after the 5 extrusion pass test described above.

In contrast, comparative formulation C1 of example 1 (where the thermoplastic polyethylene product was produced with a mixed catalyst system) was stabilized with two times the conventional stabilization package (1000 ppm each of IRGANOX™ 1076 and IRGAFOS™ 168) exhibited poor color stability (Y1 increase from −1.93 to 14.69).

Whilst not wishing to be bound by theory, it is possible that the aluminoxane in the single site catalyst system interacts with catalyst residues from the Z/N catalyst system to contribute to the color problem.

What is claimed is:

1. A process for stabilizing a thermoplastic polyethylene product during melt processing conditions wherein said thermoplastic polyolefin product is prepared with at least two catalyst systems and contains catalyst residues comprising
   a) titanium;
   b) aluminum from at least one aluminoxane; and
   c) magnesium from magnesium chloride;
      said process comprising the step of incorporating into said thermoplastic polyolefin a stabilizer package comprising:
      (i) a first phosphite defined by the formula (I);

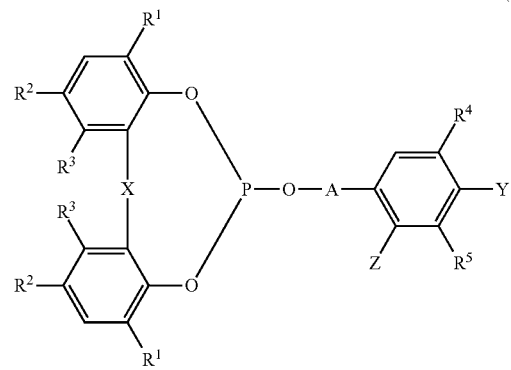

wherein $R^1$, $R^2$, $R^4$ and $R^5$ are each independently chosen from a hydrogen atom, an alkyl group having 1 to 8 carbon atoms, and $R^3$ is chosen from a hydrogen atom or an alkyl group having 1 to 8 carbon atoms; X is chosen from a single bond, a sulfur atom or a —CHR⁶ group ($R^6$ is chosen from a hydrogen atom, an alkyl group having 1 to 8 carbon atoms or a cycloalkyl group having 5 to 8 carbon atoms); A is chosen from an alkylene group having 1 to 8 carbon atoms or a *—COR⁷ group ($R^7$ is chosen from a single bond or an alkylene group having 1 to 8 carbon atoms, and * denotes a bonding hand on the side of oxygen); and one of Y and Z is chosen from a hydroxyl group, an alkoxy group having 1 to 8 carbon atoms or an aralkyloxy group having 7 to 12 carbon atoms, and the other one of Y and Z is chosen from a hydrogen atom or an alkyl group having 1 to 8 carbon atoms);

(ii) a second phosphite that is different from said first phosphite; and (iii) a hindered phenolic antioxidant;

subjecting said thermoplastic polyethylene product to sufficient temperature to cause it to melt.

2. The process of claim 1 wherein said stabilizer package further comprises an acid neutralizer.

3. The process of claim 1 wherein said catalyst residues include i) from 1 to 15 ppm of titanium; ii) from 10 to 200 ppm of aluminum; and iii) from 10 to 250 ppm of magnesium.

4. The process of claim 1 wherein said first phosphite is 6-[3-(3-tert-butyl-4-hydroxy-5-methylphenyl)propoxy]-2,4,8,10-tetra-tert-butyldibenzo[d,f][1,3,2]dioxaphospepin (CAS Reg. No. 203255-81-6).

5. The process of claim 2 wherein said second phosphite is 2,4 di-tertiary butyl phenyl phosphite.

6. The process of claim 1 wherein said first phosphite, said second phosphite and said hindered phenolic are each added in an amount of from 100 to 2000 parts per million by weight based on the weight of said thermoplastic polyethylene product.

7. The process of claim 1 wherein said thermoplastic polyethylene product is a copolymer of ethylene and at least one olefin chosen from butene, pentene, hexene and octene.

8. The process of claim 1 wherein said thermoplastic polyethylene product has a density of from 0.880 to 0.960 g/cc and a melt index, $I_2$, as determined by ASTM D1238 at 190° C./2.16 kg, of from 0.3 to 150 g/10 minutes.

9. The process of claim 6 wherein said melt processing conditions comprise a film extrusion at a temperature of from 200° C. to 320° C.

10. The process of claim 1 wherein said stabilizer formulation contains a hindered amine light stabilizer.

11. A process for preparing a thermoplastic polyethylene product comprising:

1) polymerizing polyethylene, optionally with one or more $C_{3-10}$ alpha olefins, under solution polymerization conditions in the presence of a first single site catalyst system comprising an organotitanium catalyst and an aluminoxane cocatalyst to form a first polyethylene solution;

2) polymerizing polyethylene, optionally with one or more C3-10 alpha olefins, under solution polymerization conditions in the presence of a second catalyst system comprising a titanium catalyst; an organoaluminum cocatalyst and magnesium chloride to form a second polyethylene solution;

3) combining said first polyethylene solution and said second polyethylene solution to form a combined polyethylene solution;

4) recovering said thermoplastic polyethylene product from said combined polyethylene solution; and 5) adding to said thermoplastic polyethylene product a stabilizer system comprising:

(i) a first phosphite defined by the formula (I);

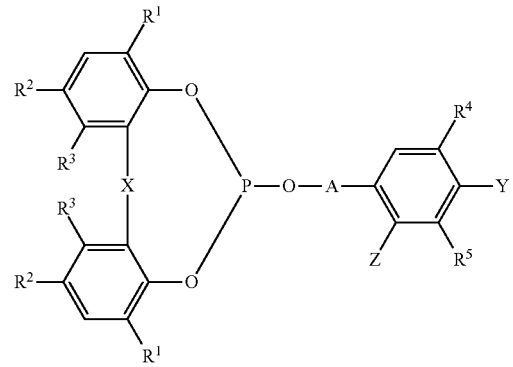

wherein R1, R2, R4 and R5 each is independently chosen from a hydrogen atom, an alkyl group having 1 to 8 carbon atoms, and R3 is chosen from a hydrogen atom or an alkyl group having 1 to 8 carbon atoms; X is chosen from a single bond, a sulfur atom or a —CHR6 group (R6 is chosen from a hydrogen atom, an alkyl group having 1 to 8 carbon atoms or a cycloalkyl group having 5 to 8 carbon atoms); A is chosen from an alkylene group having 1 to 8 carbon atoms or a *—COR7 group (R7 is chosen from a single bond or an alkylene group having 1 to 8 carbon atoms, and * denotes a bonding hand on the side of oxygen); and one of Y and Z is chosen from a hydroxyl group, an alkoxy group having 1 to 8 carbon atoms or an aralkyloxy group having 7 to 12 carbon atoms, and the other one of Y and Z is chosen from a hydrogen atom or an alkyl group having 1 to 8 carbon atoms);

(ii) a second phosphite that is different from said first phosphite; and (iii) a hindered phenolic antioxidant.

12. The process of claim 11 wherein said thermoplastic polyethylene product further comprises an acid neutralizer.

13. The process of claim 11 wherein said thermoplastic polyethylene contains catalyst residues which include i) from 1 to 15 ppm of titanium; ii) from 10 to 200 ppm of aluminum; and iii) from 10 to 250 ppm of magnesium.

14. The process of claim 11 wherein said first phosphite is 6-[3-(3-tert-butyl-4-hydroxy-5-methylphenyl)propoxy]-2,4,8,10-tetra-tert-butyldibenzo[d,f][1,3,2]dioxaphospepin (CAS Reg. No. 203255-81-6).

15. The process of claim 11 wherein said second phosphite is 2,4 di-tertiary butyl phenyl phosphite.

16. The process of claim 11 wherein said first phosphite, said second phosphite and said hindered phenolic are each added in an amount of from 100 to 2000 parts per million by weight based on the weight of said thermoplastic polyethylene product.

17. The process of claim 11 wherein said thermoplastic polyethylene product is a copolymer of ethylene and at least one olefin chosen from butene, pentene, hexene and octene.

18. The process of claim 17 wherein said thermoplastic polyethylene product has a density of from 0.880 to 0.960 g/cc and a melt index, 12, as determined by ASTM D1238 at 190° C./2.16 kg, of from 0.3 to 150 g/10 minutes.

19. The process of claim 11 wherein said stabilizer formulation contains a hindered amine light stabilizer.

* * * * *